United States Patent [19]

Bach et al.

[11] Patent Number: 5,000,673

[45] Date of Patent: Mar. 19, 1991

[54] PROCESS AND APPARATUS FOR PREPARING A FLAT-TOPPED WAVE-BOARD PANEL

[75] Inventors: Lars Bach; Eduard Stark, both of Edmonton, Canada

[73] Assignee: Her Majesty the Queen in right of Canada as represented by the Minister of Forestry, Hull, Canada

[21] Appl. No.: 342,310

[22] Filed: Apr. 24, 1989

[30] Foreign Application Priority Data

Apr. 4, 1989 [CA] Canada ................................... 595657

[51] Int. Cl.⁵ ...................... B29C 53/24; B29C 59/02
[52] U.S. Cl. .................................. 425/396; 156/62.2; 264/118; 264/119; 264/120; 425/406
[58] Field of Search ............... 264/108, 118, 119, 286, 264/293, 294, 285, 322, 120; 425/363, 396, 406, 336, 340, 369; 156/62.2, 210, 205, 219

[56] References Cited

U.S. PATENT DOCUMENTS

| | | | |
|---|---|---|---|
| 771,677 | 10/1904 | Squires | 425/396 |
| 2,481,049 | 9/1949 | Stamm et al. | 425/396 |
| 3,575,768 | 4/1971 | Hannum | 156/205 |
| 4,025,599 | 5/1977 | Keith | 264/205 |
| 4,616,991 | 10/1986 | Bach et al. | 264/118 |
| 4,624,726 | 11/1986 | Harper, Jr. | 425/363 |
| 4,668,321 | 5/1987 | Lefevre | 156/205 |
| 4,675,138 | 6/1987 | Bach et al. | 264/118 |

FOREIGN PATENT DOCUMENTS

| | | | |
|---|---|---|---|
| 1122430 | 1/1962 | Fed. Rep. of Germany | 425/396 |
| 2023775 | 1/1972 | Fed. Rep. of Germany | 264/286 |
| 56-144921 | 11/1981 | Japan | 264/286 |
| 228258 | 7/1969 | U.S.S.R. | 425/406 |
| 647136 | 2/1979 | U.S.S.R. | 264/109 |
| 1268424 | 11/1986 | U.S.S.R. | 425/363 |
| 650134 | 2/1951 | United Kingdom | 156/210 |

*Primary Examiner*—Jeffery Thurlow
*Assistant Examiner*—Mathieu Vargot
*Attorney, Agent, or Firm*—Dressler, Goldsmith, Shore, Sutker & Milnamow, Ltd.

[57] ABSTRACT

A platen assembly is provided for manufacturing flat-topped wave-board. The assembly can be mechanically converted between a planar configuration and a wave-like configuration to form a board with a flat-topped and bottomed profile.

2 Claims, 7 Drawing Sheets

PROCESS AND APPARATUS FOR PREPARING A FLAT-TOPPED WAVE-BOARD PANEL

FIELD OF THE INVENTION

The present invention relates to an apparatus and process for the manufacture of a wave-board panel.

BACKGROUND OF THE INVENTION

Typically, a wafer board panel comprises layers of wood flakes or wafers formed into a composite structure using a resinous binder. The preparation of wafer board panels is complex, but broadly consists of two principal stages. The first stage comprises the preparation of the wafers and the admixing thereof to form a loose layer or mat; the second stage involves subsequent compression and heating of the mat to cure the resin and form the consolidated panel.

Until recently, wafer board was manufactured in the form of planar or flat sheets. However, as disclosed in U.S. Pat. Nos. 4,616,991 and 4,675,138, the present applicant has developed an apparatus and process respectively for the manufacture of panels having a wave-like or corrugated configuration. Such wave-board panels have improved structural strength properties, relative to planar panels.

This prior patented apparatus involved a pair of opposed, spaced-apart, upper and lower platens. Each platen was formed of adjacent lengths of chain-like links. When the lengths were pushed inwardly from the side, they would shift from a planar to an undulating corrugated form.

The process steps involved:
distributing a mat of loose wood wafers between the upper and lower platen surfaces while they are maintained in the planar configuration;
biasing the platens together to pre-compress the mat, and thereby substantially fixing the wafers together to limit their further relative movement;
converting the two platen surfaces, still in pressing association with the mat, from the planar to the corrugated configuration; and
then applying additional pressure and heat for a sufficient time to cure the binder and produce a corrugated wave-board panel.

The main advantage inherent in the patented process was that the panel product so formed was characterized by having a substantially uniform density. This was achieved because the wafers were fixed by the pre-compression step and because the mat was not significantly stretched or elongated during the conversion from the planar to the corrugated configuration.

It will be also noted that the product formed using the particular mechanical assembly described hereabove has a generally sinusoidal configuration. The peaks and troughs of the panel have a generally rounded profile.

Certain applications of corrugated wave-board may involve the attachment of a corrugated wave-board web to either a single or two planar stressed-skin panels. Usually, the separate pieces are secured together by means of adhesives or by fastening elements. However, because of the limited contact area between the rounded peaks and troughs of the waveboard and the adjacent skins, it is often difficult to secure the separate pieces together with any stability.

In order to overcome this limitation, applicants contemplated the provision of a wave-board characterized by a flat-topped (or flat-peaked) and a flat-bottomed (or flat-troughed) profile (hereinafter referred to as a "flat-topped wave-board"). This change would increase the available attachment area between components and thus provide improved stability. Starting from this concept a particularly configured wave-board and a press platen assembly for manufacturing the wave-board has been developed.

SUMMARY OF THE INVENTION

Applicants initially attempted to modify the linkarray system described in the previously mentioned '991 patent. More specifically, an additional row of flat-topped link elements was interposed between and pivotally connected to the angled link rows, at their apexes. However, when this arrangement was tried it was found that, because of the differing frictional forces existing between the various link rows it was not possible to obtain a uniformly aligned wave configuration.

It was then discovered that, in order to attain configurational stability for this particular system it is essential to provide means for locking the angled main link rows, having the flat-topped connecting link elements therebetween, in the desired configuration. Stated otherwise, it is necessary to limit the angular rotation of the angled main link rows when the laterally-directed biasing force is applied to the platen system.

Preferably such locking means would comprise stops associated with each side of the connecting flat-topped link elements which stops cooperate with the angled main links so as to function in a hinge-like manner.

As a result of this provision it is possible to convert the links from the planar position to the flat-topped position. The flat-topped panel prepared by the apparatus of the present invention is advantageously characterized by exhibiting improved strength and bending properties which inherently accompany this particular configuration.

Broadly stated, the invention is a platen assembly, for use in forming flat-topped wave-board panels, comprising: first means for forming a planar support surface; parallel, spaced apart, elongate end members forming inner working faces that are generally perpendicular to the support surface, at least one of said end members being movable toward the other along the support surface while remaining parallel thereto; a plurality of elongate link elements positioned on the support surface in spaced relationship, between the end members, said elements being slidable along the surface in parallel relationship, said link elements forming a generally planar upper surface; first and second opposed pivoting link elements, said link elements each being pivotally connected at one end to an adjacent link element whereby the pair of first and second pivoting elements extend between a pair of link elements; connecting link elements forming a generally planar upper surface, said connecting link elements each being pivotally connected between a pair of first and second pivoting link elements, whereby the connecting link elements maintain the pivoting link elements connected thereto in spaced apart relationship; means associated with each pair of pivoting link elements and their associated connecting link element, for releasably limiting the pivoting elements to a generally inverted v-shaped configuration, with said connecting link elements lying in a horizontal plane therebetween, when the end members are biased together; and means for moving the end members together and apart to convert the link elements between the corrugated and planar forms.

In a second broad aspect, the invention provides a wave-board formed of binder-coated wafers which have been subjected to binder curing and compression which comprises: a board having a wave-like configuration and generally flat at its top and bottom, said board having a substantially uniform density throughout.

DESCRIPTION OF THE PREFERRED EMBODIMENT

Having reference to the accompanying drawings, there is shown a platen assembly 1, which includes a base plate 2.

Four elongate key-ways are cut in the upper face of the lower and upper base plates 2a and 2b respectively. The key-ways are parallel and extend longitudinally the length of the base plate 2, at spaced points across its width.

An elongate stop member 4a is affixed to the base plate 2a along one edge thereof and extends transversely thereacross.

A second elongate stop member 4b is similarly affixed to the base plate 2b.

An elongate biasing member 5 is positioned on each of the base plates 2 along its other edge in opposed relation to the stop members 4. The biasing member 5 has downwardly extending keys (not shown) for engaging the key-ways 3. Thus the transversely extending biasing member 5 is slidable along the base plate 2 toward the stop member 4. The walls of the key-ways 3 are operative to maintain the biasing member 5 parallel to the stop member 4.

The stop member 4 and biasing member 5 form end members for the platen to be described hereinafter.

A pair of double-acting hydraulic cylinders 6 are secured to the base plate 2 at one end thereof in spaced apart relationship. The cylinders 6 extend longitudinally parallel to the main axis of the base plate 2. The pistons 6a of the cylinders 6 are secured to the biasing member 5. Extension or contraction of the cylinders 6 serves to advance or retract the biasing member 5, along the key-ways 3, toward or away from the stop member 4 and parallel thereto.

Secured to the biasing member 5 is a row 7 comprised of side-by-side end links 7a.

Figure 7:
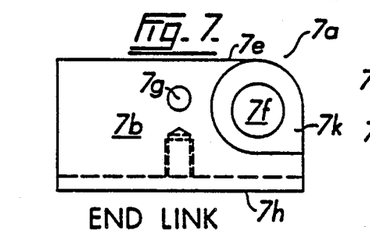
FIGS. 7 and 8, and 9 are side views, plan views and end views respectively of an end link.
Figure 8:
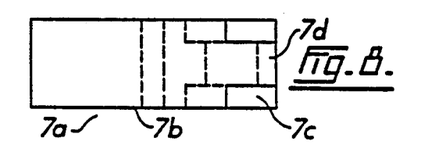
Figure 9:
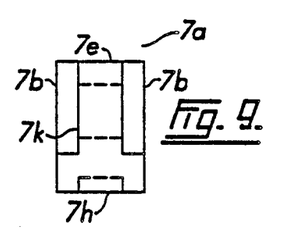
Figure 10:
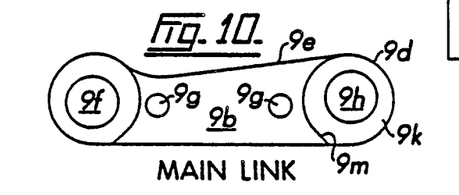
FIGS. 10, 11, and 12 are side views, end views and plan views respectively of a main link.
Figure 11:
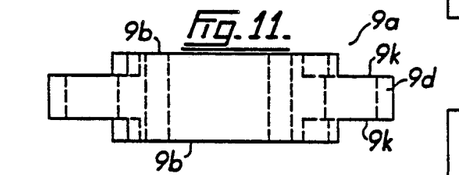
Figure 12:
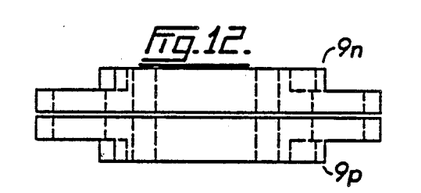
Figure 13:
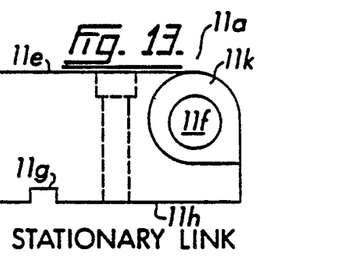
FIGS. 13 and 14 are side views and plan views respectively of a stationary link.
Figure 14:
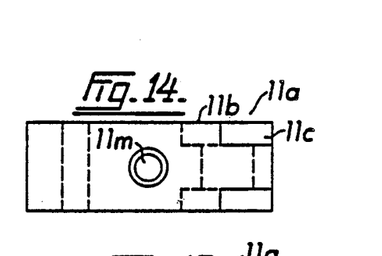

As shown in FIGS. 7, 8, and 9 each end link 7a comprises an elongate generally rectangular block 7b having on one of its upper corners a pair of generally circular cut away sections 7c leaving a central tongue 7d therebetween. A generally circular bore 7f extends through the central tongue 7d. A second circular bore 7g is further defined in the block 7b for reasons to be described later. A key 7h extends downwardly for engaging the key-ways 3.

Spaced apart link rows 8 extend transversely across the base plate 2 parallel to the end link row 7, stop members 4 and biasing members 5.

Each row 8, is comprised of discreet sliding link members 8a positioned in side-by-side relationship. It will be noted that the upper working face 8e of each sliding link 8a is flat so as to impart a planar or flat top to the troughs 19 of the panel.17.

Figure 15:
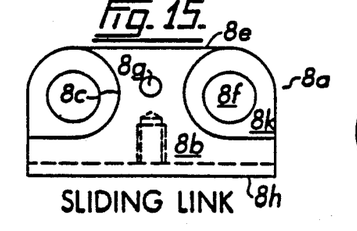
FIGS. 15 and 16 are side views and plan views respectively of a sliding link.
Figure 16:
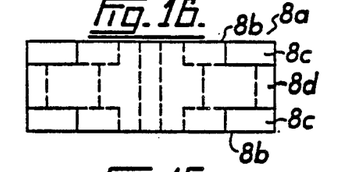

As detailed in FIGS. 15 and 16, each sliding link 8a comprises a generally rectangular block 8b having each of its four upper corners cut away in a generally circular fashion to form grooves 8c. Thus there are left two central segments 8d, one between each pair of grooves 8c on either side of block 8b. Each central segment 8d forms a transverse bore 8e and 8f respectively. A further bore 8g extends transversely through the upper portion of the block 8b. The functions of the sliding link 8a, its grooves 8c and bores 8e and 8f respectively will be described below. Each link 8a forms a downwardly extending key 8h for engaging the key-ways 3.

Thus the sliding links 8a in each row 8 abut one another in closely positioned consolidated formation. Each row 8 comprising a link element 8a is slidable as a unit along the length of the base plate 2.

A first row of main links 9, is pivotally connected on one side thereof to the row 7 of end links and on the other to a first row of connecting links 10.

An identical row of main links 9 is similarly pivotally connected on one side to the first row of connecting links 10 and on its other to the row of sliding links 8.

Subsequent rows of main links 9 are alternatively pivotally connected to sliding links 8 and connecting links 10 as illustrated.

Thus the rows of links 9 comprise the first and second opposed pivoting link elements.

Each link row 9 is formed of an array of side-by-side individual main links 9a which dovetail at each end with the sliding links 8 and connecting links 10.

As shown in FIGS. 10, 11, 12 and 19 each main link 9a comprises an elongate generally rectangular block 9b. A pair of generally circular grooves 9c are cut away on each of its outer ends leaving generally circular tongues 9d herebetween. Generally circular bores 9f and 9h respectively are formed in each of the tongue portions 9d. A second pair of bores 9g are formed in the block 9b for reasons to be described hereinafter.

A row 10 of connecting links 10a is positioned between each row 9 of opposed main links 9a and pivotally connected thereto by means of rods 12.

Figure 17:
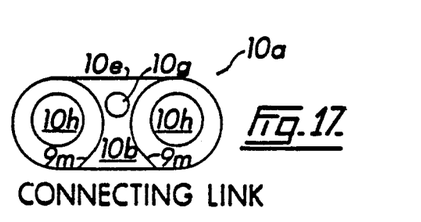
FIGS. 17 and 18 are side views and plan views respectively of a connecting link.
Figure 18:
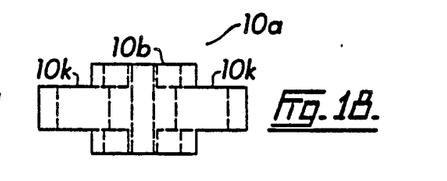
Figure 19:
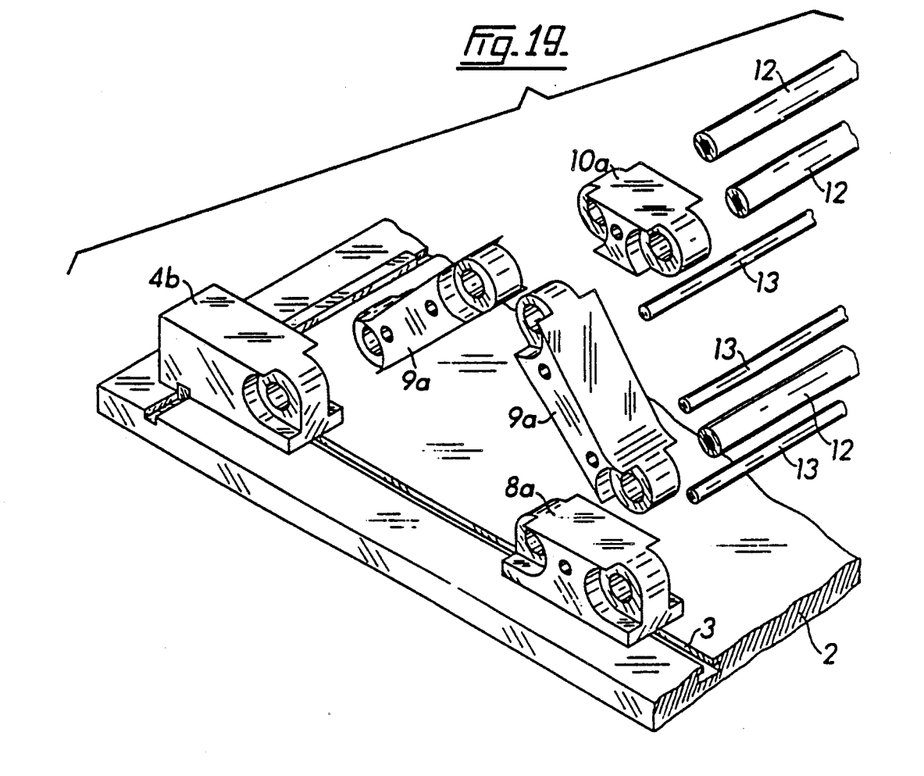
FIG. 19 is an exploded view of the link elements making up the assembly.
Figure 20:
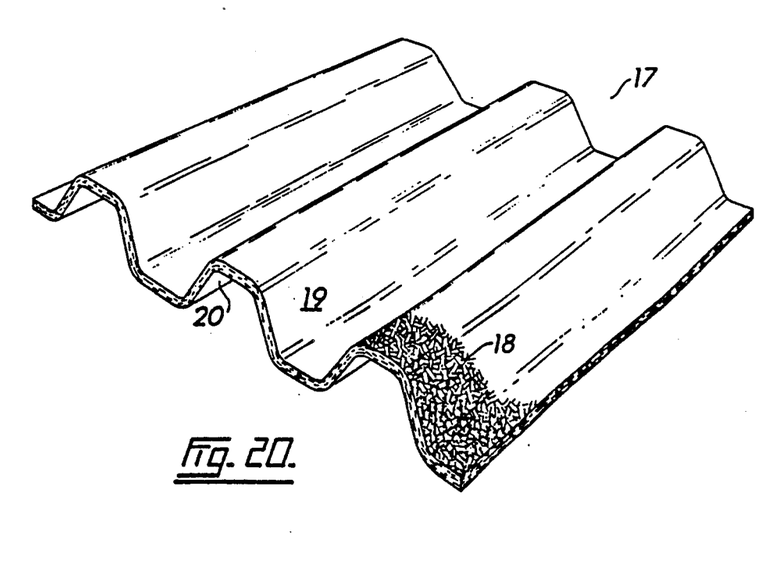
FIG. 20 is a perspective view of the flat-topped wafer-board panel product.

As shown in FIGS. 17, 18, and 19 each connecting link 10a comprises a generally L-shaped block 10b having planar upper and lower surfaces 10e. Each of the link 10a's upper corners are cut away in a generally circular fashion to form arcuate grooves 10c. Thus are left two upper and lower central tongue segments 10d. Circular bores 10h are provided in segments 10d. A central bore 10g is further formed in the central portion 10b for reasons to be described hereinafter.

In assembly, therefore, the faces 8k and 9k of the individual links 8a and 9b are brought into abutting engagement one with another. The rods 12 extend through their aligned bores 8f and 9f respectively. Similarly, the faces 9k and 10k of the links 9a and 10a respectively are contiguous with the rod 12 extending through their aligned bores 9h and 10h respectively.

It will be noted that the arrangement of alternating tongue's grooves 9c and tongues 9d on the main links 9 and alternating grooves 10c and tongues 10d formed on the connecting links 10 function to limit the angular rotation of the pivotally interconnected links 9 and 10, operating in a hinge-like manner. In the locked position the opposed pivoting main links are fixed into a generally inverted v-shape. Thus, when the biasing force is applied to the sliding elements 8a, the sliding link rows 8 will pivot only to the extent that the top connecting link rows 10 lie in a generally horizontal plane. As a result of this arrangement, stop means are provided for releasably limiting the pivoting elements to a generally inverted v-shaped configuration with said connecting link elements lying in a horizontal plane therebetween.

Adjacent the stop member 4 is a row 11 of side by side end links 11a. Each end link 11a which is of a generally rectangular shape forms a block 11b. At its outer end the side is cut away in a generally circular fashion to form grooves 11c. Thus is left a central segment 11d which forms a circular bore 11f.

Transversely extending across the lower plate 2a are provided spacers 15. Also provided on the base plate 2a and associated with said spacers 15 are lifters 16 which function to guide the directional movement of the main links 9 and connecting links 10.

The mechanical assembly is characterized by the following:
the sliding link rows are fixed to the base plate by the key and key-way interconnections—they can travel along the length of the base plate toward each other in parallel formation but their elevation remains constant;
when the lateral biasing force is applied initially, the pivoting main link rows move upwardly, only to a predetermined position. The top connecting link row, which at this point is lying at an inclined angle, falls back into a planar position as the biasing force is continued and the opposed pivoting row is rotated only to a predetermined extent whereupon the top connecting link row is locked in the horizontal plane by the provision of the aforementioned stop means.

Stated otherwise, the first and second opposed pivoting link elements, sliding link elements and connecting link elements having locking means associated therewith cooperate to provide a substantially non-porous platen whose surface configuration is mechanically convertible between a substantially planar form and a corrugated form wherein the peaks and troughs of the corrugations are characterized by being of a generally flat or planar profile.

Heating means are supplied to heat the platen 1. Such means are provided by electrical heating rods 13 which extend through the bores 8g, 9g, and 10g respectively as described hereabove.

Figure 21:
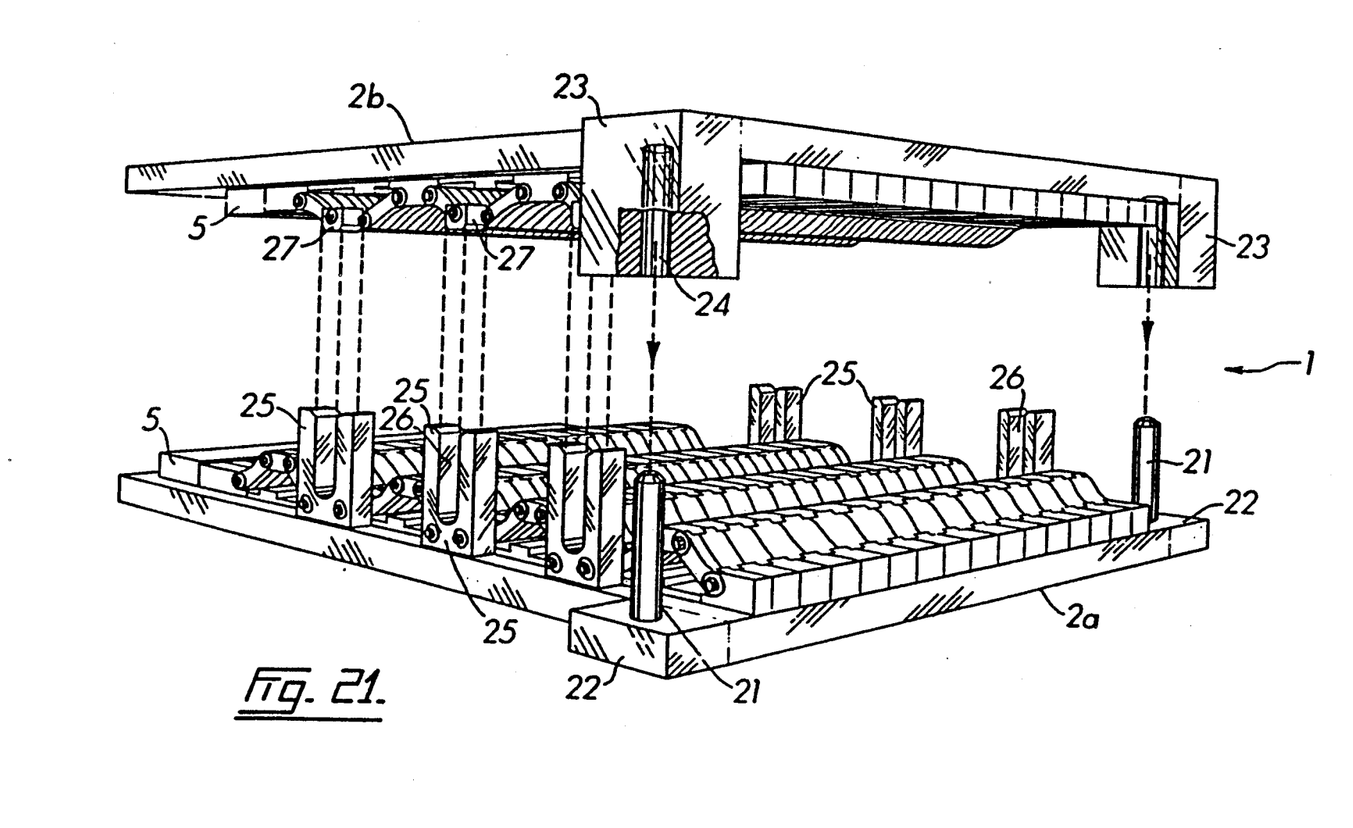
FIG. 21 is a perspective view of the upper and lower platens illustrating their respective alignment members.

Having reference in particular to FIG. 21 there is provided means for aligning the lower and upper platens 2a and 2b respectively one with another. More specifically, a pin 21 is mounted on block 22 of the lower platen 2a. An upper block 23 having a female bore 24 in registration with pin 21 is mounted thereabove an upper platen 2b. A plurality of U-shaped guides 25 are positioned in spaced apart relationship on the lower platen 2b. Corresponding sliders 27 adapted to conform to the U-shaped guides are mounted at spaced intervals on the upper platen 2b.

Figure 1:
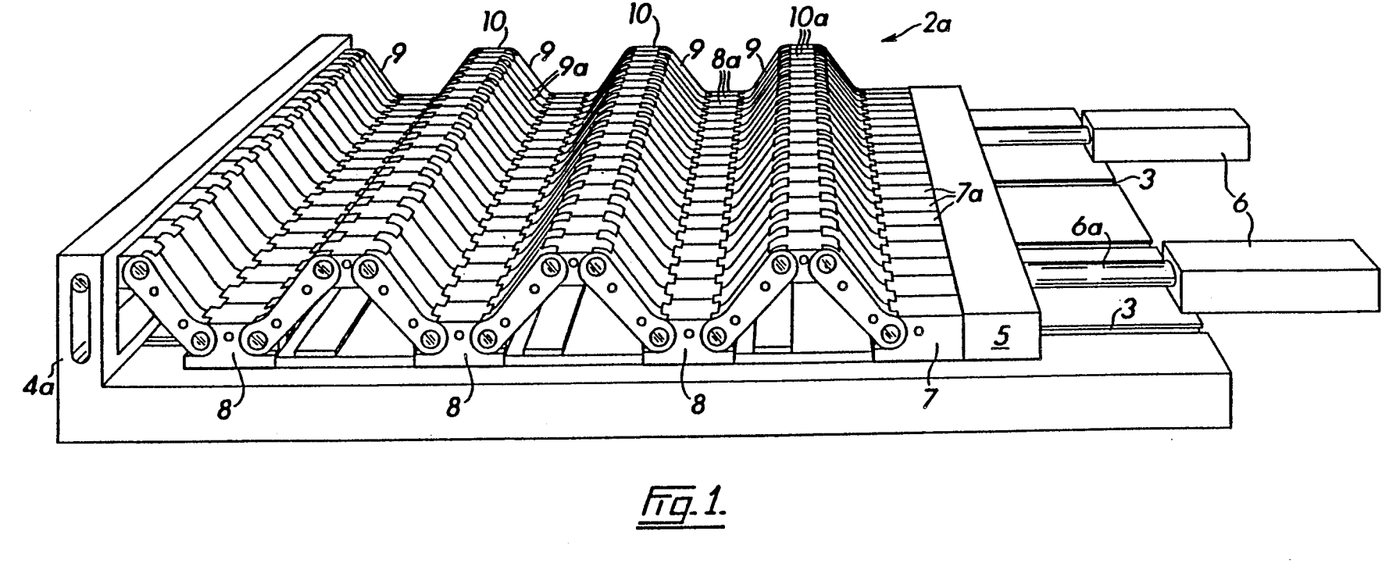
FIG. 1 is a perspective view showing a lower platen assembly in accordance with the invention with the links in the corrugated position.
Figure 2:
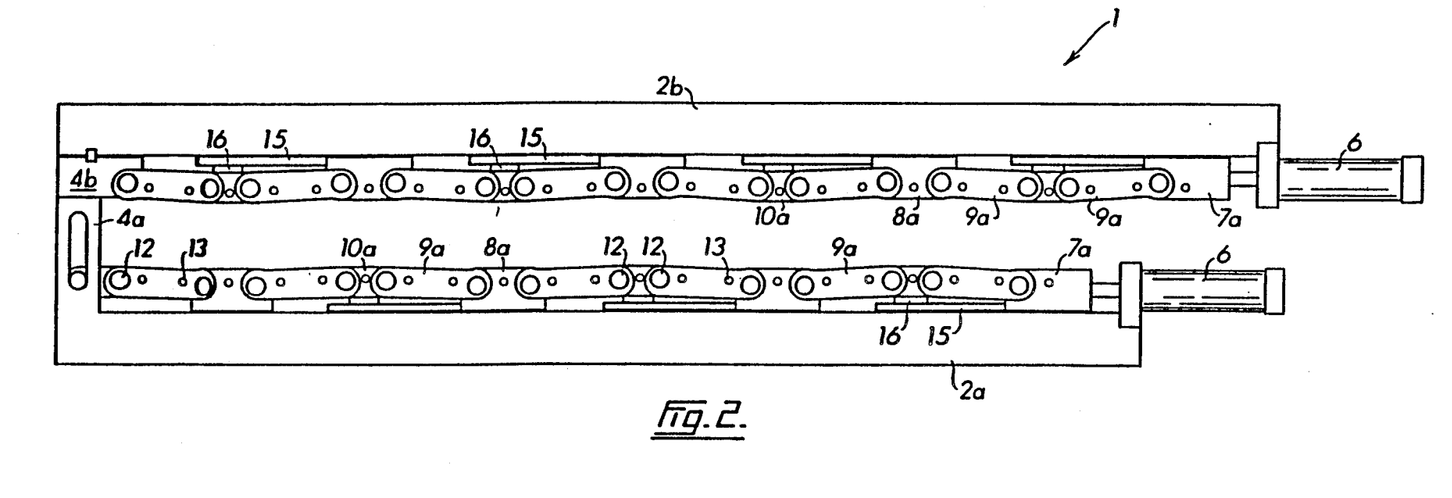
FIG. 2 is a side view showing the upper and lower platen assemblies in the generally planar configuration.
Figure 3:
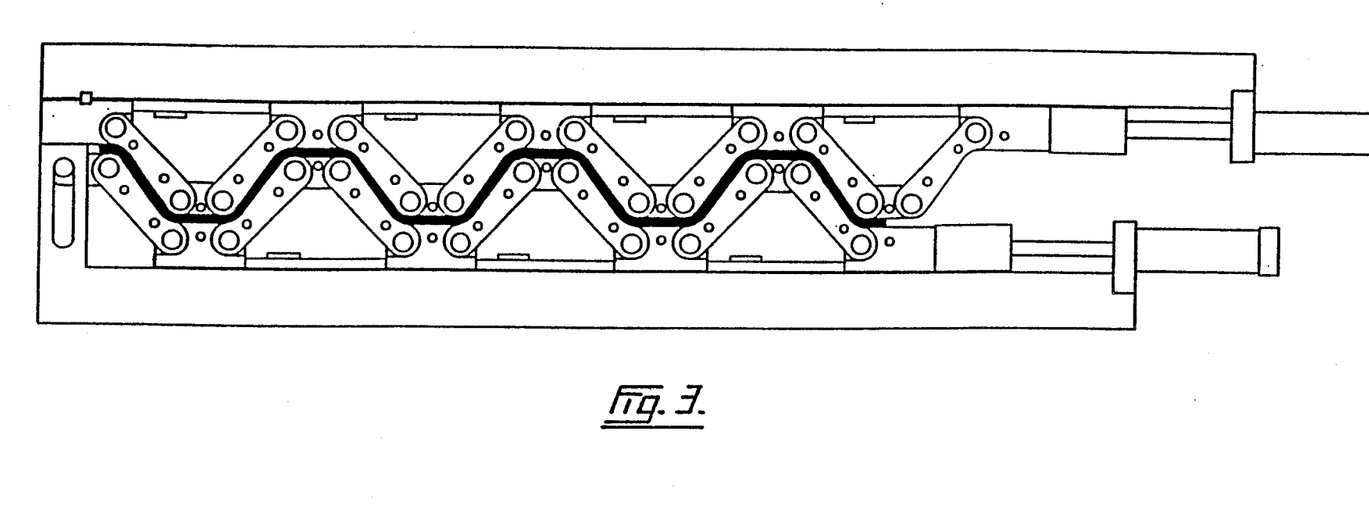
FIG. 3 is a side view illustrating the upper and lower platen assemblies in the fully corrugated mode with the wafer mat therebetween.
Figure 4:
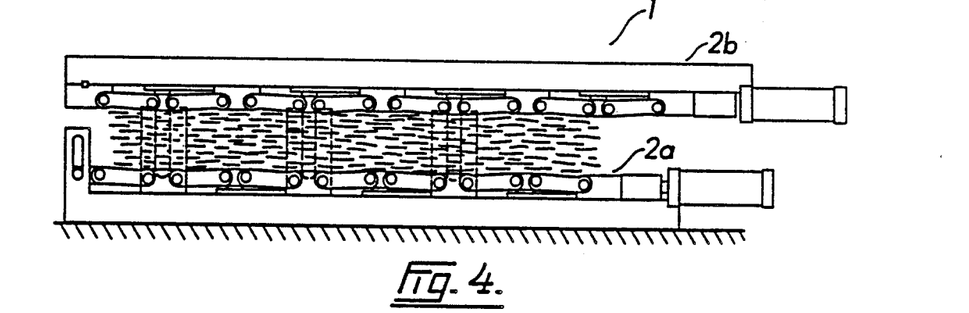
FIG. 4 is a side view showing upper and lower platens with the mat therebetween prior to compression.
Figure 5:
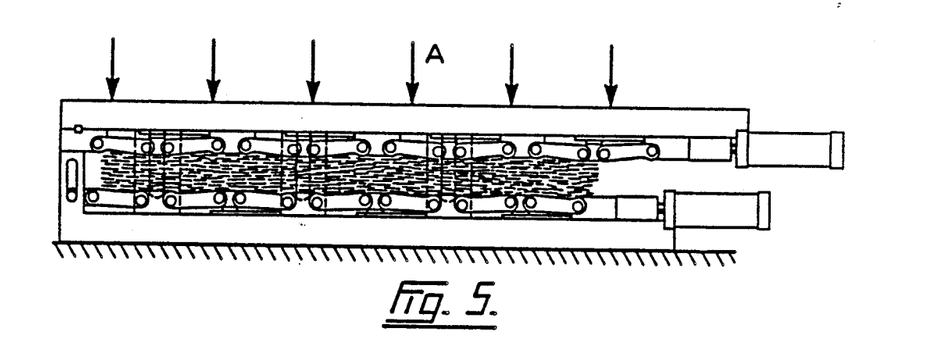
FIG. 5 is a side view showing upper and lower platens at the commencement of the compression step.
Figure 6:
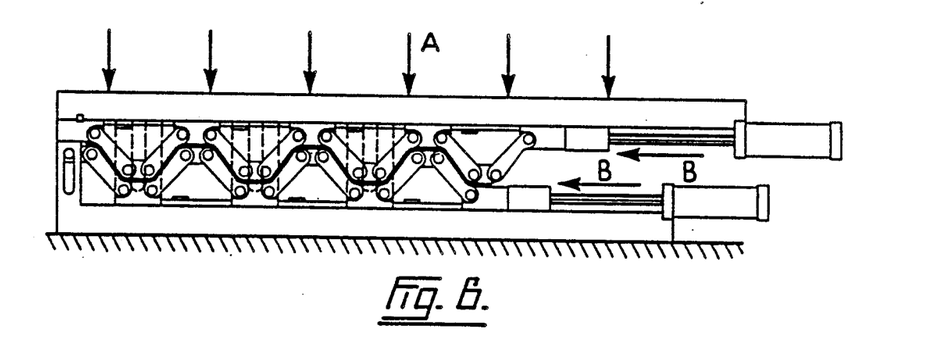
FIG. 6 is a side view showing the press assembly in the fully corrugated position.

FIG. 3 shows two horizontal platen assemblies in spaced apart opposed relationship. Conventional press members (not shown) may be connected to the platen assemblies 1, for biasing the latter together in a vertical direction and applying pressure thereto.

The process for producing the flat-topped waveboard was as follows.

The furnish could be prepared using various wood species. Aspen logs, approximately 8" length and 6"–14" in diameter were used. The logs were cleaned, debarked, waferized and screened in accordance with conventional methods. The strand or wafer length averaged 76 mm (3") and the thickness was about 0.76 mm (0.03"), however other strand or wafer geometries may be used. The length of the strands may range up to 6".

The moisture content of the furnish was reduced from the green state to about 5% using commercial dryers. The wafers were screened following drying.

At 5% moisture content, the furnish was blended with 3% by weight of powdered phenol formaldehyde resin and 1% by weight wax in a drum blender. Wax was utilized to improve the moisture resistance of the panel. Resin was utilized as a binder for the wafers.

The wafers and wax/resin in admixture were arranged loosely by hand between two flexible stainless steel screens (cauls) to form the mat. The quantity of wafers and resin used was sufficient to produce a board having the required density. The cauls had previously been dusted with talcum powder to prevent bonding of the wafers thereto. Using the cauls the mat was transferred to the press.

In the press, the mat was subjected simultaneously to high temperature, which set the binder and to high pressure which compressed the mat to its specified thickness. The platen temperature was maintained at 205° C.

The press members were actuated to force the flat platen assemblies 1 toward one another, pre-compressing the mat thereby substantially fixing the wafers together and restricting their relative movement. The vertical pre-compression force applied was of the order of $10^6$ Newtons. At this displacement, the cylinders 6 were actuated to cause the biasing members 5 of the two platen assemblies 1 to move toward the stop members 4. The magnitude of the applied laterally - directed force was of the order of $10^6$ Newtons.

A final compression was applied by bringing the press platens closer together until the latter reached their stops. The panel was retained between the press platens for four minutes to permit the resin to set.

Prior to removal of the finished wave-panel from the press, the pressure was released slowly to avoid steam release damage.

The panels were then cooled.

Experimental

The following table provides a comparison of the panel properties of flat-topped corrugated waferboard, sinusoidal corrugated waferboard and ordinary flat (i.e. planar) waferboard.

| Panel Properties | Flat top corrugated waferboard | Sinusoidal corrugated waferboard | Ordinary flat waferboard |
| --- | --- | --- | --- |
| Panel density (kg/m$^3$) | 681 | 647 | 665 |
| Unit panel mass (kg/m$^2$) | 9.2 | 8.6 | 7.7 |
| Wavelength (mm) | 310 | 188 | – |
| Panel depth (mm) | 104 | 65 | 11.6 |
| skin thickness (mm) | 10.4 | 11.2 | 11.6 |
| MC (%) | approx. 4% | 4.1 | 3.6 |
| Unit max. moment (Nmm/mm) Bending strength | 4624 | 4000 | 587 |
| Unit EI (Nmm$^2$/mm) Bending stiffness | 50,300,000 | 20,400,000 | 724,000 |

The embodiments of the invention in which an exclusive property or privilege is claimed are defined as follows:

1. A platen assembly, for use in forming flat-topped wave-board panels, comprising:

first means for forming a support surface;

parallel, spaced apart, elongate end members forming inner working faces that are generally perpendicular to the support surface, at least one of said end members being movable toward the other along the support surface while remaining parallel thereto;

a plurality of elongate link elements positioned on the support surface in spaced relationship, between the end members, said link elements being slidable along the surface in parallel relationship, said sliding link elements forming a generally planar working surface;

first and second opposed pivoting link elements, said link elements each being pivotally connected at one end to an adjacent sliding link element whereby the pair of first and second pivoting elements extend between a pair of link elements;

connecting link elements forming a generally planar working surface, said connecting link elements each being pivotally connected between a pair of first and second pivoting link elements, whereby the connecting link elements maintain the pivoting link elements connected thereto in spaced apart relationship;

means associated with each pair of pivoting link elements and their associated connecting link element, for releasably limiting the pivoting elements to a generally inverted v-shaped configuration, with said connecting link elements lying in a horizontal plane therebetween, when the end members are biased together; and means for moving the end members together and apart to convert the link elements between corrugated flat-topped and bottomed and planar forms.

2. A platen assembly, for use in forming flat-topped wave-board panels, comprising:

a planar base plate;

an elongate stop member secured to the base plate and extending along one side edge thereof;

an elongate biasing member extending along the other side edge of the base plate parallel to the stop member;

a plurality of elongate sliding link elements arranged on the base plate in equidistantly spaced apart parallel array between the stop member and the biasing member;

said biasing member and link elements being slidably secured to the base plate, whereby they may slide toward the stop member in parallel formation while remaining secured to the base plate;

a first and second array of spaced apart side-by-side link elements, the inner ends of adjacent link arrays being pivotally connected to the adjacent sliding link elements for rotation about an axis parallel to the main plane of the base plate;

a third array of side-by-side connecting link elements, said third array of link elements being positioned between the outer ends of said first and second arrays of link elements, and being pivotally connected thereto at each of its ends, said third array of link elements further forming stop means thereon to thereby limit the degree of rotation of the first and second arrays of link elements as the biasing force is applied to the platen assembly whereby when the platen assembly is in the corrugated form, said third array of link elements are locked into a generally horizontal plane;

said arrays of link elements and plurality of sliding link elements combining to form a substantially non-porous and planar surface when the sliding elements are maximally spaced apart and a substantially non-porous corrugated flat-topped and bottomed undulating surface when they are minimally spaced apart; and means for biasing the biasing member to shift the bracing elements between the planar and corrugated positions.

* * * * *